(12) United States Patent
Stojkovic et al.

(10) Patent No.: US 9,248,868 B2
(45) Date of Patent: Feb. 2, 2016

(54) VEHICLE FRONT END STRUCTURE

(71) Applicant: FORD GLOBAL TECHNOLOGIES, LLC, Dearborn, MI (US)

(72) Inventors: Dragan B. Stojkovic, Taylor, MI (US); Colleen Marie Hoffman, Canton, MI (US); Kimberly Ann Lazarz, Ypsilanti, MI (US); Robert G. Starbowski, Brighton, MI (US); Donald L. Jordan, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/290,283

(22) Filed: May 29, 2014

(65) Prior Publication Data

US 2015/0344079 A1 Dec. 3, 2015

(51) Int. Cl.
| B62D 21/00 | (2006.01) |
| B62D 27/02 | (2006.01) |
| B62D 25/08 | (2006.01) |
| B62D 29/00 | (2006.01) |
| B62D 21/15 | (2006.01) |
| B62D 25/16 | (2006.01) |

(52) U.S. Cl.
CPC .............. *B62D 27/023* (2013.01); *B62D 25/08* (2013.01); *B62D 29/00* (2013.01); *B62D 21/152* (2013.01); *B62D 21/155* (2013.01); *B62D 25/085* (2013.01); *B62D 25/163* (2013.01)

(58) Field of Classification Search
CPC .... B62D 21/152; B62D 21/155; B62D 25/08; B62D 25/085; B62D 25/163; B62D 27/023; B62D 29/00

USPC ............................ 296/187.09, 203.02, 193.09
See application file for complete search history.

(56) References Cited

U.S. PATENT DOCUMENTS

| 4,270,793 | A | 6/1981 | Harasaki et al. |
| 4,545,612 | A | 10/1985 | Harasaki |
| 4,883,309 | A | 11/1989 | Miyazaki et al. |
| 5,201,566 | A | 4/1993 | Mori |
| 5,624,150 | A | 4/1997 | Venier |
| 6,139,093 | A | 10/2000 | Elliott et al. |
| 6,209,950 | B1 | 4/2001 | Hanyu |
| 6,267,437 | B1 | 7/2001 | Morsch et al. |
| 6,322,134 | B1 | 11/2001 | Yang |
| 6,416,119 | B1 * | 7/2002 | Gericke et al. ................ 296/205 |
| 6,679,547 | B2 | 1/2004 | Ju-Sik |
| 7,036,874 | B2 | 5/2006 | Stojkovic et al. |
| 7,066,533 | B2 | 6/2006 | Sohmshetty et al. |
| 7,090,273 | B2 | 8/2006 | Stojkovic et al. |
| 7,118,166 | B2 * | 10/2006 | Seksaria et al. ............... 296/192 |

(Continued)

*Primary Examiner* — Joseph D Pape
*Assistant Examiner* — Dana Ivey
(74) *Attorney, Agent, or Firm* — Jason Rogers; Brooks Kushman P.C.

(57) ABSTRACT

A vehicle front end structure includes a longitudinally extending upper tube, and a longitudinally extending lower tube. The upper and lower tubes are conjoined to each other along a substantial portion of the total length of the tubes. The front end structure also includes a coupling bracket that is secured to an outer wall of each of the upper and lower tubes near a rear edge of the tubes. The coupling bracket also includes an extension tab cantilevered from the rear edge of the tubes. Additionally, the front end structure includes a hinge pillar defining a first vertical mounting surface secured to an inner wall of the upper and lower tubes. The hinge pillar also defines a second vertical mounting surface secured to the extension tab of the coupling bracket.

14 Claims, 5 Drawing Sheets

(56) References Cited

U.S. PATENT DOCUMENTS

| | | |
|---|---|---|
| 7,140,672 B2 | 11/2006 | Chernoff et al. |
| 7,140,674 B2 | 11/2006 | Miyoshi et al. |
| 7,243,986 B2 | 7/2007 | Dupuis et al. |
| 7,267,394 B1 * | 9/2007 | Mouch et al. ............ 296/203.02 |
| 7,390,056 B1 | 6/2008 | Stojkovic et al. |
| 7,574,801 B2 | 8/2009 | Lowe et al. |
| 7,798,560 B2 | 9/2010 | Hedderly |
| 7,871,123 B2 | 1/2011 | Stojkovic et al. |
| 7,887,122 B2 | 2/2011 | Baccouche et al. |
| 8,002,337 B2 | 8/2011 | Baccouche et al. |
| 8,201,873 B2 | 6/2012 | Nishimura et al. |
| 8,517,458 B2 | 8/2013 | Lassl et al. |
| 8,550,545 B1 | 10/2013 | Stojkovic et al. |
| 8,651,563 B2 | 2/2014 | Mildner et al. |
| 8,727,428 B2 | 5/2014 | Takeuchi et al. |
| 8,833,832 B2 | 9/2014 | Whipps |
| 2002/0096384 A1 | 7/2002 | Yoshida et al. |
| 2006/0108837 A1 | 5/2006 | Deme et al. |

* cited by examiner

VEHICLE FRONT END STRUCTURE

TECHNICAL FIELD

The present disclosure relates to a configuration for joining a tubular vehicle front end structure to a vehicle passenger cabin.

BACKGROUND

Vehicle front end structures provide mounting features for various vehicle components including body panels, hoods, and engine components for example. The front end structure may further be utilized to manage loads from vehicle impact and other sources. Several structural impact tests apply loads to a vehicle where the magnitude is based on the weight of the vehicle. Larger vehicles having higher mass such as pickup trucks may be required to withstand increased loads as compared to smaller vehicles. Particularly with the use of advanced lightweight materials, the joining method of the front structure to a vehicle cabin may have a direct relation to vehicle functional performance.

Dissimilar metals have different electrode potentials. Commonly, materials of interfacing parts are selected from a similar alloy to avoid galvanic corrosion. However competing strength and weight demands may drive a need for dissimilar alloys across various locations of the vehicle.

SUMMARY

In at least one embodiment, a vehicle front end structure includes a longitudinally extending upper tube, and a longitudinally extending lower tube. The upper and lower tubes are conjoined to each other along a substantial portion of the total length of the tubes. The front end structure also includes a coupling bracket that is secured to an outer wall of each of the upper and lower tubes near a rear edge of the tubes. The coupling bracket also includes an extension tab cantilevered from the rear edge of the tubes. Additionally, the front end structure includes a hinge pillar defining a first vertical mounting surface secured to an inner wall of the upper and lower tubes. The hinge pillar also defines a second vertical mounting surface secured to the extension tab of the coupling bracket.

In at least one embodiment, a vehicle includes a fender disposed adjacent to a lateral edge of a hood, and a hinge pillar extending vertically at a rear edge of the fender. The vehicle also includes an upper tube extending longitudinally from the hinge pillar. The upper tube defines a top wall including a fender attachment, and an opposing bottom wall. The vehicle further includes a lower tube extending longitudinally from the hinge pillar and conjoined to the bottom wall of the upper tube along a majority length of the tubes.

In at least one embodiment, a vehicle includes a passenger cabin including a plurality of aluminum panels and a front end structure including a plurality of steel tubes extending longitudinally from the passenger cabin. The vehicle also includes a steel coupling bracket secured to at least one of the aluminum panels and coupling two conjoined tubes. The bracket also defines notched edges at a location predisposed to buckle in response to column loading of the tubes. The coupling bracket and tubes also have a surface coating that includes aluminum.

The above aspects of the disclosure and other aspects will be apparent to one of ordinary skill in the art in view of the attached drawings and the following detailed description of the illustrated embodiments.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

A common multiple axis system is used in each of the figures to indicate relative directions with respect to the vehicle. An X-axis denotes a longitudinal direction, a Y-axis denotes a lateral direction, and a Z-axis denotes an upward direction.

Figure 1:
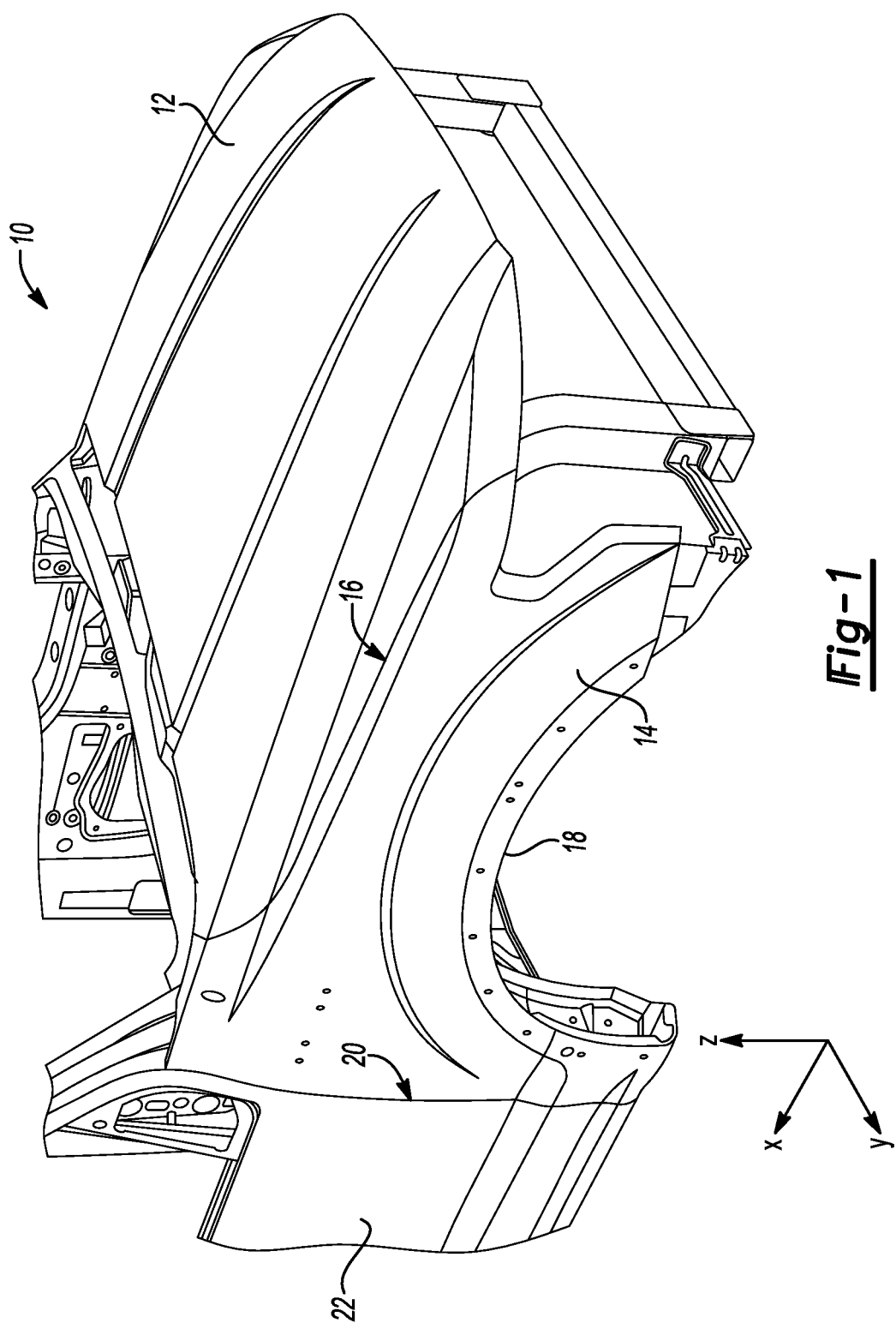
FIG. 1 is a right side front perspective view of a portion of a front end of a vehicle.

Referring to FIG. 1, a front end of a vehicle 10 is depicted that supports several outer panels. A hood 12 is hinged and covers an engine compartment in a closed position. Access to the engine compartment is allowed when the hood 12 rotated to an open position. Each of a pair of fenders 14 is adjacent to a lateral edge of the hood 12 on either side. The fenders 14 are fixed and create a margin gap 16 to the hood 12. The fenders 14 also create an interface to a front wheel well 18 at a lower portion. At a rear portion, the fenders 14 create a margin gap 20 to a side door 22. Both of the fenders 14 and the hood 12 require sufficient underlying front end structure in order to maintain proper fits relative to each other, as well as operability.

Figure 2:
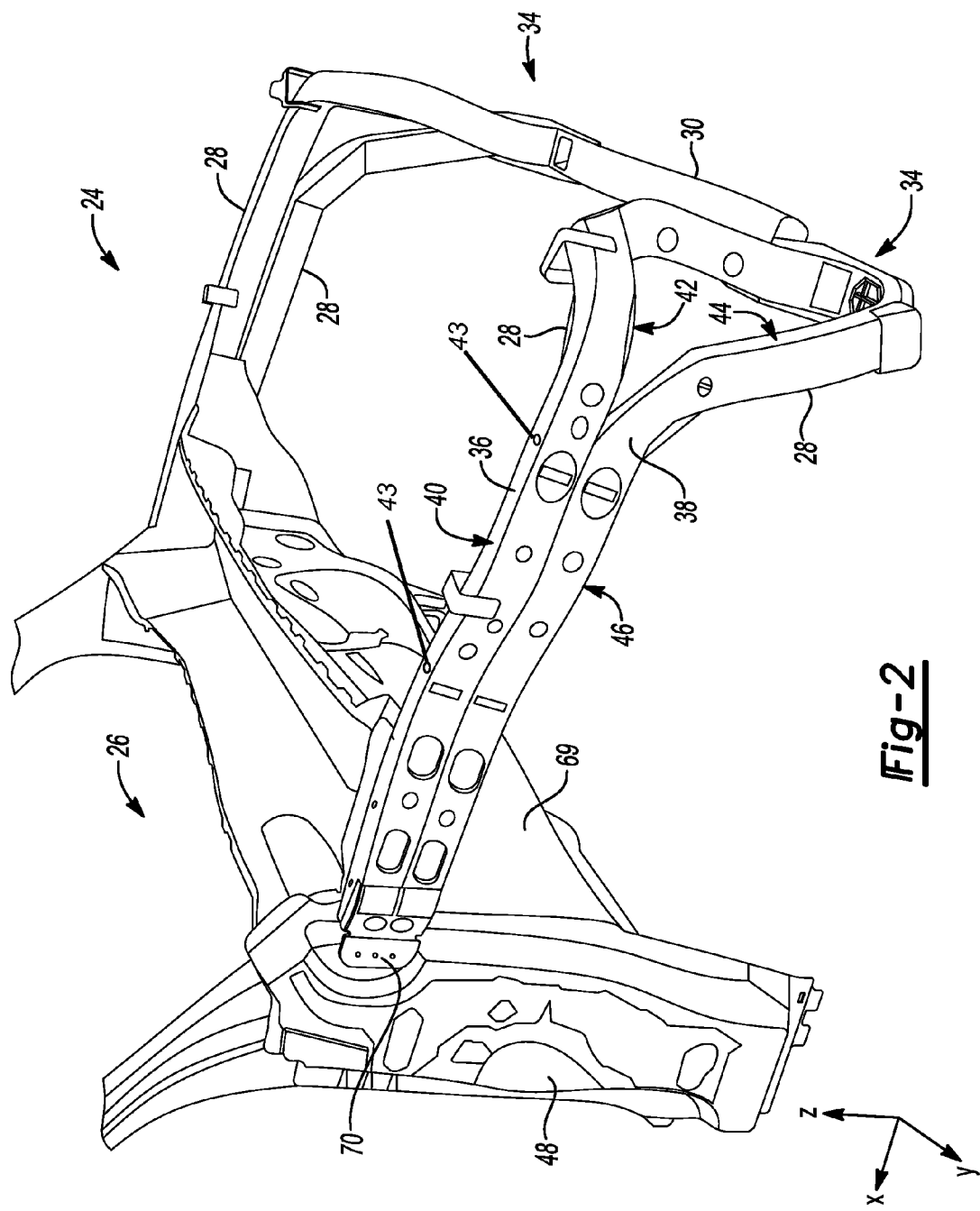
FIG. 2 is a front right side perspective view of a structural support of the vehicle of FIG. 1.

Referring to FIG. 2, a front end structure 24 extends forward from a passenger cabin 26. The front structure 24 provides mounting support for the hood 12, fenders 14, as well as other front end components. The front end structure 24 includes a plurality of tubular supports 28 that extend longitudinally from the passenger cabin 26. Each tubular support 28 is formed as a hollow structure, and may be shaped by hydroforming stock tube material for example. A forward lateral member 30 extends across the vehicle and interconnects each of the tubular supports 28 at a front end 34 of each respective tube.

In at least one embodiment, each of the tubular supports 28 is hydro-formed from a closed section stock steel tube. For example, high-strength low-alloy (HSLA) steel may be particularly suitable. Steel grades having yield strengths generally in the range of 250-500 MPa may be suitable to accommodate vehicle front end loading requirements. Additionally, the wall thickness of the tubular supports may be from about 1.3 mm to 1.8 mm. More specifically, the wall thickness may be about 1.5 mm. The tubular supports 28 may be also be formed of different structural materials such as aluminum, magnesium, titanium, polymers, composite materials, and others.

In a preferred embodiment, two conjoined tubes are disposed on each side of the vehicle 10. An upper tube 36 extends longitudinally from the passenger cabin 26. Similarly, a lower tube 38 also extends longitudinally from the passenger cabin 26. The upper and lower tubes 36, 38 are conjoined to each other along a substantial length of both of the tubes. For example, the tubes 36, 38 may be conjoined for about 70% of the axial span of the front end structure 24.

The upper and lower tubes 36, 38 are stacked vertically and are conjoined along a majority length from the passenger cabin 26 to the front end 34. The upper tube 36 defines a top wall 40, and an opposing bottom wall 42. The top wall 40 of the upper tube includes features to accommodate attachment features 43 for the fender 14. The lower tube 38 also defines a top wall 44 and a bottom wall 46. The top wall 44 of the lower tube 38 is secured to the bottom wall 42 of the upper tube 36. The respective walls may be joined to each other by a number various attaching methods including welding, bonding, fasteners, as well as other securing techniques.

The tubular supports 28 may be substantially straight and maintain a generally uniform cross-section near a rear region that attaches to the passenger cabin 26. The substantially straight portions enhance load carrying capabilities of the tubular supports 28.

Figure 3:
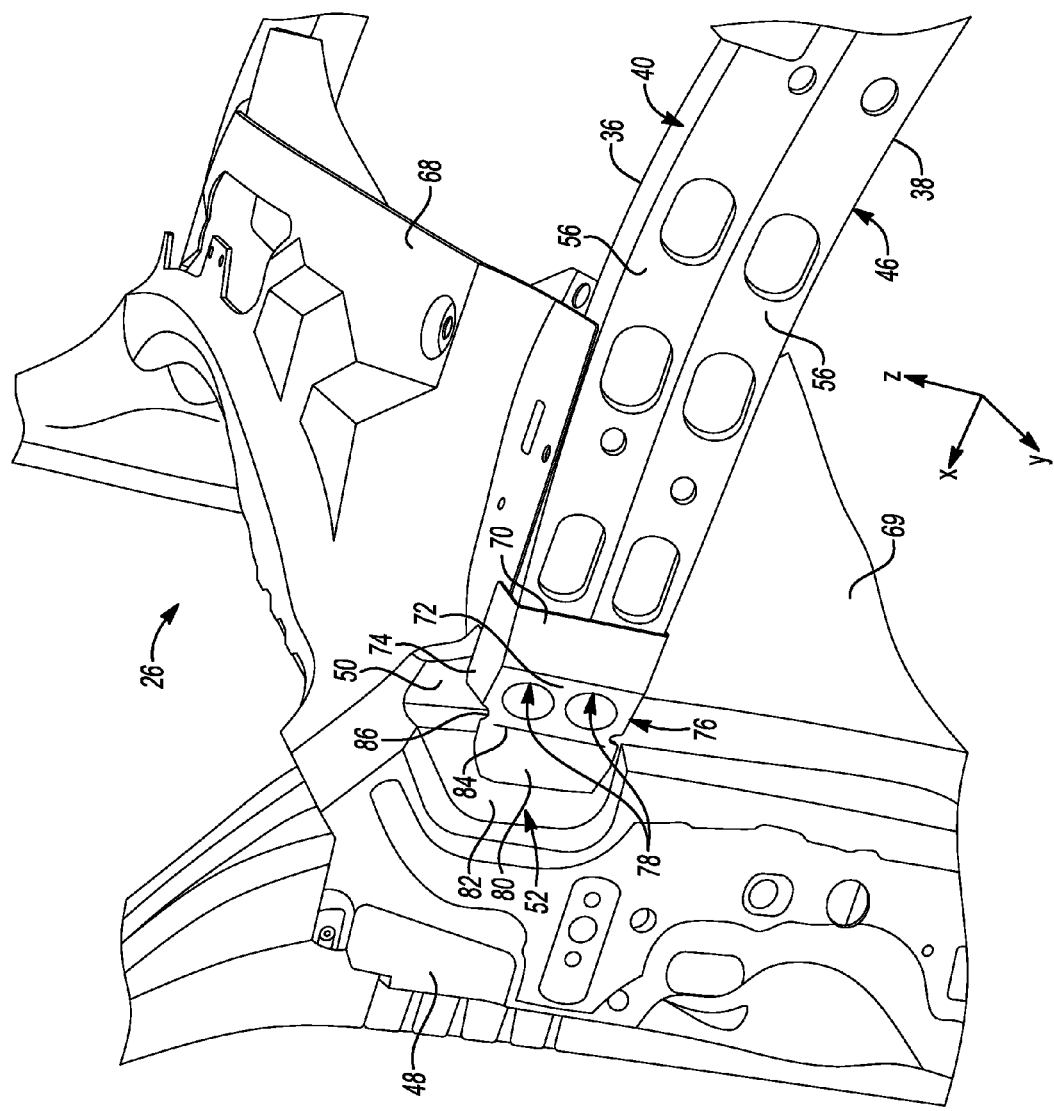
FIG. 3 is a fragmentary perspective view of a structural support joint to a front pillar.
Figure 4:
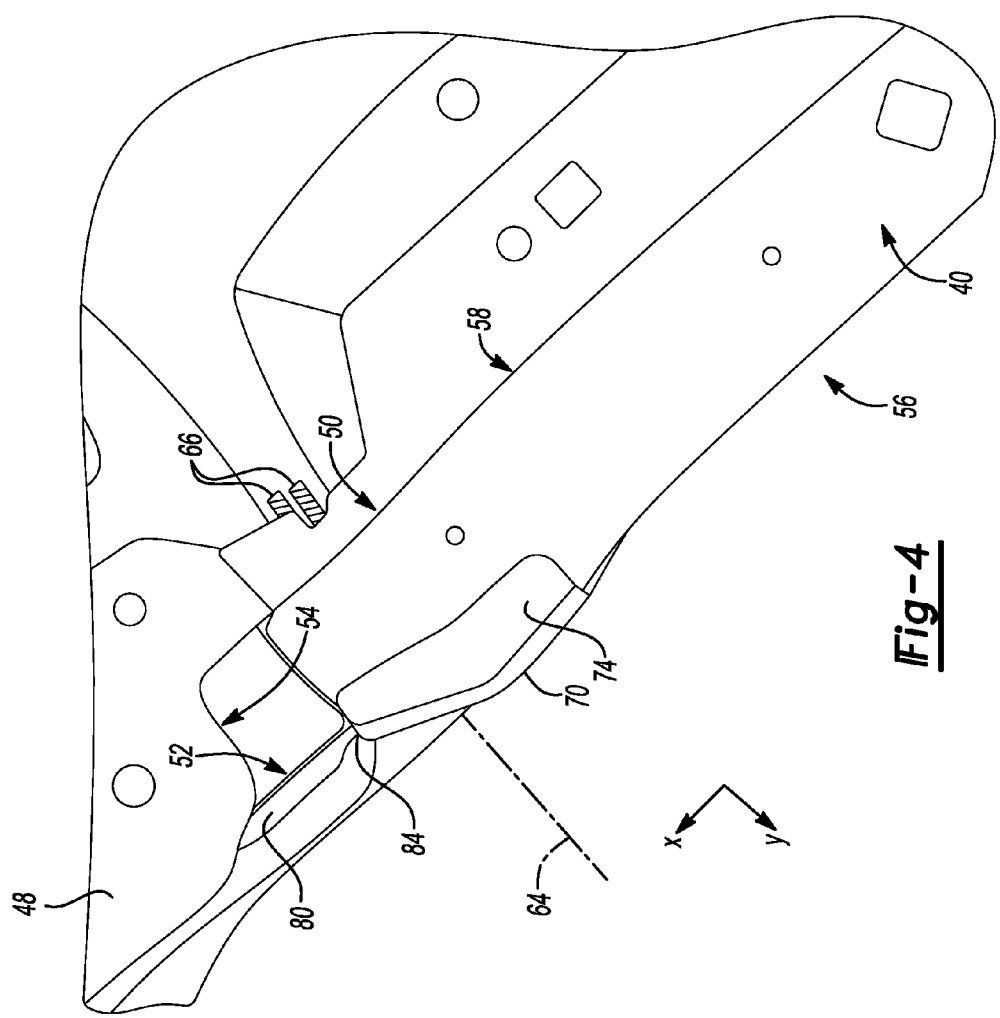
FIG. 4 is a plan view of the structural support joint of FIG. 3.

Referring to FIGS. 3 and 4, the passenger cabin 26 is constructed from a plurality of aluminum panels. For example, a material such as a 6000 series aluminum alloy may be particularly suitable. A vertical hinge pillar 48 is disposed at a forward portion of the passenger cabin 26, and has a formation to receive the ends of each of the pair of conjoined tubes. The hinge pillar 48 is provided with a plurality of laterally-facing vertical mounting surfaces at different positions to allow the tubular supports 28 to nest in a corresponding shape. The hinge pillar 48 includes a first vertical mounting surface 50 and a second vertical mounting surface 52. The vertical mounting surfaces 50, 52 extend in a longitudinal direction. A laterally extending step 54 interconnects the first and second mounting surfaces 50, 52 and provides a continuous transition surface. The first mounting surface 50 is forward and inboard relative to the second mounting surface 52.

The tubular supports 28 include a pair of laterally spaced vertical walls. Each of the upper tube 36 and the lower tube 38 include an outer wall 56 and an inner wall 58 that are generally parallel to each other. The outer and inner walls 56, 58 partially define an internal cavity of the tubular supports 28.

At least one fastener 66 secures the tubular supports 28 to the hinge pillar 48 near the rear edge 62. A plurality of fastener types may be suitable for securing the tubular supports 28 to the hinge pillar 48. For example, a combination of threaded fasteners, rivets, welds, and/or adhesive bonding may be used to join the components of the front structure 24. In at least one embodiment, the hinge pillar 48 is provided with a plurality of fixed nuts, and threaded bolts are driven through the inner wall 58 to secure the tubular supports 28.

A generally horizontal cowl top panel 68 extends laterally across the vehicle, and is secured to the top wall 40 of the upper tube 36. Also, a cowl side panel 69 extends longitudinally from the hinge pillar 48. The inner wall 58 of the upper and lower tubes 36, 38 is secured to the cowl side panel 69. The securing direction of the tubes to the cowl side panel 69 may be in a lateral direction so as to be common with the securing direction of the tubes to the hinge pillar 48. There may be a series of lateral securing locations extending forward along the length of the tubes 36, 38.

A coupling bracket 70 is also provided to glove an end portion of both of the upper and lower tube 36, 38. The coupling bracket 70 includes a main body 72 that is secured to the outer walls 56 of the upper and lower tubes 36, 38. An upper flange 74 extends laterally from the main body 72 and is attached to the top wall 40 of the upper tube 36. Similarly, a lower flange 76 extends laterally from the main body 72 and is attached to the bottom wall 46 of the lower tube 38.

The coupling bracket 70 also defines a plurality of clearance holes 78. The clearance holes 78 are in alignment with a chamfered trim 60 of a rear edge 62 of the tubular supports 28. The clearance holes 78 also align with the securing location of the tubular members 28. The clearance holes 78 provide a line of access for an assembly tool to secure the tubular supports 28 to the hinge pillar 48. The clearance holes 78 facilitate sub-assembly of the coupling bracket 70 to the conjoined tubular members 28 prior attachment to the passenger cabin 26.

Figure 5:
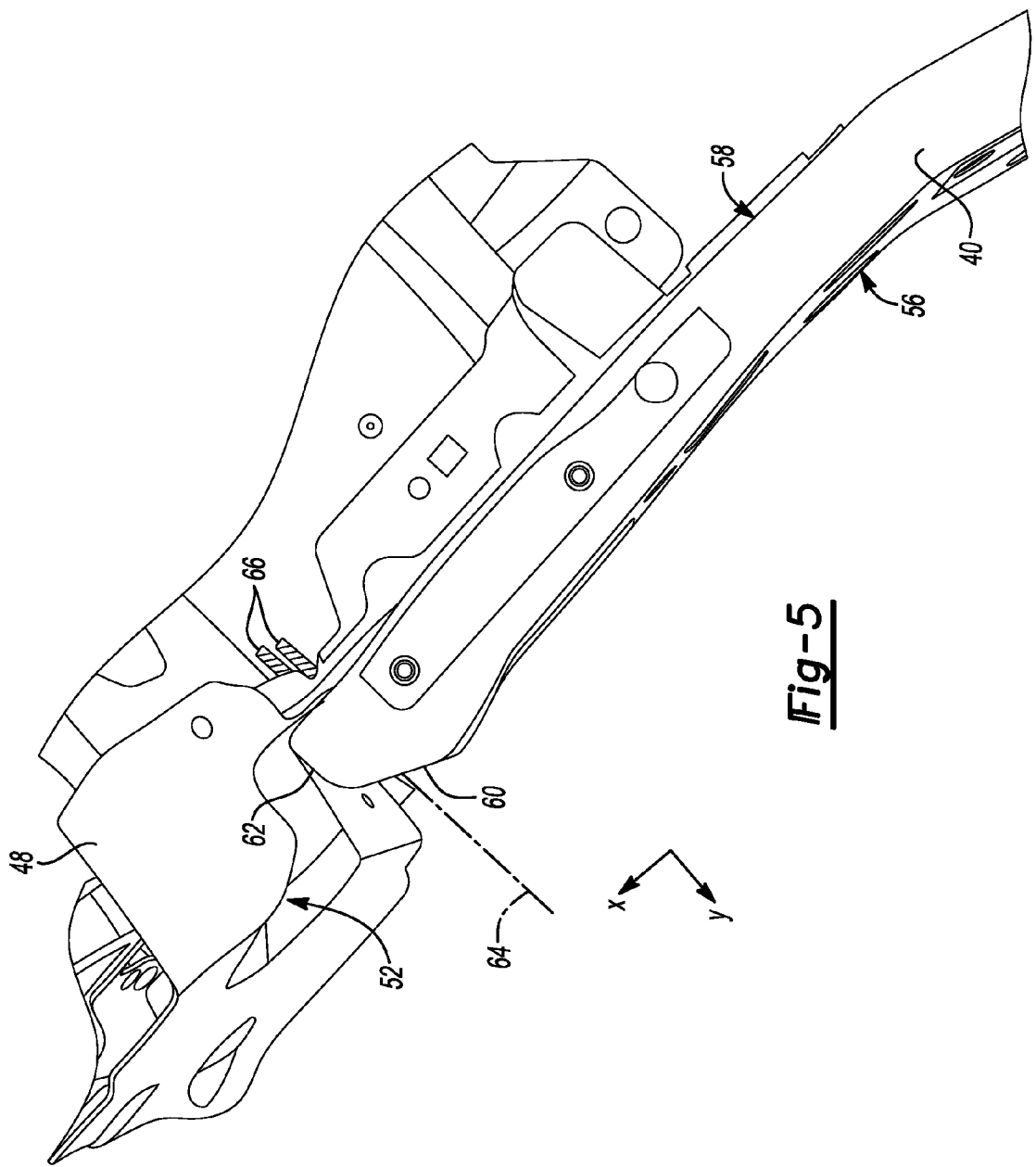
FIG. 5 is a plan view of the structural support joint of FIG. 3 with the coupling bracket removed.

Referring to FIG. 5, the coupling bracket is removed to reveal one example of the chamfered trim 60 corresponding to a rear edge 62 of the tubular supports 28. The outer wall 56 terminates forward of the inner wall 58 at the rear edge 62 of the tubular supports 28. As discussed above, the chamfered trim 60 cooperates with clearance holes 78 of the coupling bracket 70 to provide access for a securing tool to secure the inner wall 58 to the hinge pillar 48.

Referring back to FIGS. 3 and 4, the coupling bracket 70 includes an extension tab 80 that is cantilevered from the rear edge 62 of the tubular members 28. The extension tab 80 may be directly secured to the hinge pillar 48. The hinge pillar 48 may also be provided with a recessed pocket 82 defining one or more of the mounting surfaces. In at least one embodiment, the recessed pocket 82 defines the second mounting surface 52 at the base of the pocket. The recessed pocket 82 may include sufficient depth to allow the extension tab 80 to be sub-flush relative to an outer portion of the hinge pillar 48 when secured.

A load management strategy may be used to direct how energy is dissipated in response to the application of loads to the front end structure 24. The tubular supports 28 are conjoined and generally behave like a unitary beam that column loads in response to axial forces in a longitudinal direction. Energy is efficiently transferred from the tubular supports 28 to the hinge pillar 48.

Structural features may be provided to influence both the rate as well as the locations where energy is absorbed by the front structure 24. The coupling bracket 70 may be used to help control energy transfer from loads applied to the front structure 24. The coupling bracket may include an angled bend 84 that is predisposed to buckle in response to axial loads applied to the tubular supports 28. The angled bend 84 extends vertically across the extension tab 80. Also, notched edges 86 may be provided on the top and bottom edges of the coupling bracket 70 to further enhance the targeting of a flexure location and the controlled dissipation of energy.

As discussed above, the front structure 24 of the vehicle 10 has a number of steel components that are secured to aluminum components. In at least one embodiment, an aluminized or aluminum alloy surface coating is provided as an outer layer of the steel parts. The aluminized coating is metallurgically bonded to the underlying steel, and isolates the steel from directly contacting the aluminum parts. A number of different coating types may be suitable. For example, corrosion protection can be enhanced using Type 1 Aluminized (Al–approx. 9% Si), Type 2 Aluminized ("pure" Al), Galvalume™ (approx. 55% Al, 43% Zn, 2% Si), Galfan™ (approx. 95% Zn, 5% Al, trace mischmetal), or ZAM™ (Zn+ approx. 6% Al, 3% Mg). The particular coating selection will also influence the desired coating weight as well as resiliency such that the coating is not damaged during part fabrication.

Selection of a more diverse mixture of metals may be employed to provide higher strength structural parts to meet load requirements, while also providing lightweight materials in areas where loading requirements are less intense. In at least one embodiment, the hood, fenders, cowl side panel, and hinge pillar are formed from aluminum alloy sheet material. Also, the tubular members and the coupling bracket are formed from a steel alloy having an aluminized or aluminum alloy surface coating. The aluminized or aluminum alloy coating allows for the joining of several components consisting of dissimilar metal alloys while reducing or eliminating galvanic corrosion effects that may otherwise occur related to a mixed material selection.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle front end structure comprising:
   a longitudinally extending upper tube;
   a longitudinally extending lower tube conjoined to the upper tube along a substantial length of both of the upper and lower tubes;
   a coupling bracket secured to an outer wall of the upper and lower tubes near a rear edge of the tubes, the coupling bracket including an extension tab cantilevered from the rear edge; and
   a hinge pillar defining a first vertical mounting surface secured to an inner wall of the upper and lower tubes, and a second vertical mounting surface secured to the extension tab.

2. The vehicle front end structure of claim 1 wherein the upper and lower tubes each define a chamfered trim at the rear edge and the outer wall of the tubes terminates forward of the inner wall of the tubes, and wherein the coupling bracket defines a clearance hole in alignment with the chamfered trim to allow a tool to extend through the clearance hole and the chamfered trim to secure the inner wall to the hinge pillar.

3. The vehicle front end structure of claim 1 wherein the hinge pillar further comprises a recessed pocket that defines the second vertical mounting surface at a base of the recessed pocket.

4. The vehicle front end structure of claim 1 further comprising a generally horizontal cowl top panel that extends laterally across the vehicle and is secured to a top wall of the upper tube.

5. The vehicle front end structure of claim 1 wherein the hinge pillar is comprised of an aluminum alloy, and wherein the upper and lower tubes are formed from a steel alloy having a surface coating that includes aluminum.

6. The vehicle front end structure of claim 1 wherein the coupling bracket is formed from a steel alloy having surface coating that includes aluminum.

7. The vehicle front end structure of claim 1 wherein the coupling bracket defines an upper flange secured to a top wall of the upper tube and a lower flange secured to a bottom wall of the lower tube.

8. The vehicle front end structure of claim 1 wherein the coupling bracket defines an angled bend extending vertically across the extension tab to operate as a buckling location of the bracket in response to column loading of the tubes.

9. A vehicle comprising:
   a passenger cabin including a plurality of aluminum panels;
   a front end structure including a plurality of steel tubes extending longitudinally from the passenger cabin;
   a steel coupling bracket secured to an aluminum panel and coupling two conjoined tubes, and defining notched edges predisposed to buckle in response to column loading of the tubes; and
   an aluminized surface coating covering outer surfaces of the steel coupling bracket and conjoined tubes.

10. The vehicle of claim 9 wherein an aluminum panel of the passenger cabin defines a recessed pocket to receive the steel coupling bracket.

11. The vehicle of claim 9 wherein the plurality of steel tubes comprises an upper tube and a lower tube stacked vertically and conjoined along a substantial length from a rear edge of the tubes.

12. The vehicle of claim 11 wherein the coupling bracket defines an upper flange affixed to a top wall of the upper tube, and a lower flange affixed to a bottom wall of the lower tube.

13. The vehicle of claim 9 wherein the coupling bracket includes a main body coupling the conjoined tubes, and an extension tab secured to the aluminum panel, and wherein the coupling bracket defines an angled bend extending vertically across the extension tab between the notched edges to buckle in response to column loading of the tubes.

14. The vehicle of claim 9 wherein the conjoined tubes are secured laterally to at least two of the plurality of aluminum panels.

* * * * *